United States Patent
Uehata et al.

(10) Patent No.: US 9,982,368 B2
(45) Date of Patent: May 29, 2018

(54) FLAME-RETARDANT FIBER, METHOD FOR PRODUCING SAME, FABRIC USING FLAME-RETARDANT FIBER, AND RESIN COMPOSITE MATERIAL USING FLAME-RETARDANT FIBER

(71) Applicant: KURARAY CO., LTD., Kurashiki-shi (JP)

(72) Inventors: Akihiro Uehata, Kurashiki-shi (JP); Tetsuya Okamoto, Kurashiki (JP); Takayuki Ikeda, Kurashiki (JP)

(73) Assignee: KURARAY CO., LTD., Kurashiki-shi (JP)

(*) Notice: Subject to any disclaimer, the term of this patent is extended or adjusted under 35 U.S.C. 154(b) by 384 days.

(21) Appl. No.: 14/798,994

(22) Filed: Jul. 14, 2015

(65) Prior Publication Data

US 2015/0315725 A1 Nov. 5, 2015

Related U.S. Application Data

(63) Continuation of application No. PCT/JP2014/050213, filed on Jan. 9, 2014.

(30) Foreign Application Priority Data

Jan. 18, 2013 (JP) .................... 2013-007314

(51) Int. Cl.
| | |
|---|---|
| *D01F 6/62* | (2006.01) |
| *C08J 5/04* | (2006.01) |
| *D01D 5/08* | (2006.01) |
| *D01F 6/74* | (2006.01) |
| *D01F 6/94* | (2006.01) |
| *D01F 1/04* | (2006.01) |
| *D01F 1/10* | (2006.01) |
| *D01F 1/06* | (2006.01) |

(52) U.S. Cl.
CPC ....... *D01F 6/62* (2013.01); *C08J 5/04* (2013.01); *D01D 5/08* (2013.01); *D01F 1/04* (2013.01); *D01F 1/06* (2013.01); *D01F 1/106* (2013.01); *D01F 6/74* (2013.01); *D01F 6/94* (2013.01); *C08J 2367/03* (2013.01); *C08J 2379/08* (2013.01); *C08J 2467/03* (2013.01); *C08J 2479/08* (2013.01); *Y10T 428/249921* (2015.04)

(58) Field of Classification Search
None
See application file for complete search history.

(56) References Cited

U.S. PATENT DOCUMENTS

| | | |
|---|---|---|
| 4,943,481 A | 7/1990 | Schilo et al. |
| 5,110,880 A | 5/1992 | Harris et al. |
| 8,853,288 B2 | 10/2014 | Ikeda et al. |
| 2007/0224422 A1 | 9/2007 | Fakhreddine et al. |
| 2012/0015184 A1 | 1/2012 | Endo et al. |
| 2013/0123437 A1 | 5/2013 | Endo et al. |
| 2013/0158143 A1 | 6/2013 | Ikeda et al. |
| 2015/0069654 A1 | 3/2015 | Endo et al. |

FOREIGN PATENT DOCUMENTS

| | | |
|---|---|---|
| CN | 1313361 A | 9/2001 |
| EP | 0 138 129 A1 | 4/1985 |
| JP | 61-500023 A | 1/1986 |
| JP | 63-303115 A | 12/1988 |
| JP | 2001-271227 A | 10/2001 |
| JP | 2003-327802 A | 11/2003 |
| WO | 85/01509 A | 4/1985 |
| WO | 2007/111809 A | 10/2007 |
| WO | 2010/109962 A | 9/2010 |
| WO | 2012/014713 A | 2/2012 |
| WO | WO 2012/023173 A1 | 2/2012 |

OTHER PUBLICATIONS

Extended European Search Report dated Jul. 18, 2016 in Patent Application No. 14740507.0.
Combined Office Action and Search Report dated Apr. 28, 2017 in Taiwanese Patent Application No. 103101546 (with English translation of the Search Report).
U.S. Appl. No. 13/812,697, filed Jan. 28, 2013, US2013/0123437 A1, Endo, et al.
U.S. Appl. No. 13/234,561, filed Sep. 16, 2011, US2012/0015184 A1, Endo, et al.
U.S. Appl. No. 14/539,657, filed Nov. 12, 2014, US2015/0069654 A1, Endo, et al.

*Primary Examiner* — Ana L Woodward
(74) *Attorney, Agent, or Firm* — Oblon, McClelland, Maier & Neustadt, L.L.P.

(57) ABSTRACT

Provided is a flame-retardant fiber having improved light resistance and/or colorability. The flame-retardant fiber is a fiber including a fiber-forming polymer. The fiber-forming polymer contains a polymer blend comprising a polyetherimide polymer (A) and a thermoplastic polymer (B) having a glass transition temperature lower than that of the polymer (A); and the fiber-forming polymer further contains a functional additive (C) that provides light resistance, colorability, or both of light resistance and colorability. The mass ratio (A)/(B) of the polymer (A) to the polymer (B) is from 50/50 to 90/10, and the content of the functional additive (C) is from 0.5 to 10% by mass relative to 100% by mass of the total mass (A+B+C) of the polymer (A), the thermoplastic polymer (B), and the functional additive (C).

17 Claims, No Drawings

FLAME-RETARDANT FIBER, METHOD FOR PRODUCING SAME, FABRIC USING FLAME-RETARDANT FIBER, AND RESIN COMPOSITE MATERIAL USING FLAME-RETARDANT FIBER

CROSS REFERENCE TO THE RELATED APPLICATION

This application is a continuation application, under 35 U.S.C. § 111(a), of international application No. PCT/JP2014/050213, filed Jan. 9, 2014, which claims priority to Japanese Patent Application No. 2013-007314, filed Jan. 18, 2013, the entire disclosure of which is herein incorporated by reference as a part of this application.

FIELD OF THE INVENTION

The present invention relates to a flame-retardant fiber that is improved in light resistance and/or colorability (tintability), a method for producing the same, a fabric formed of the fiber, and a thermoplastic polymer composite material containing the flame-retardant fiber. The flame-retardant fiber can be obtained by allowing a specific amount of a functional additive, such as carbon black, that provides light resistance and/or colorability to be contained in a flame-retardant fiber including a polyetherimide polymer and a thermoplastic polymer having a particular relationship with the polyetherimide polymer.

BACKGROUND ART

Patent Document 1 (International Publication No. WO2010/109962) discloses a polyetherimide fiber having excellent heat resistance and a small single fiber fineness suitable for producing fabrics.

Patent Document 2 (International Publication No. WO2007/111809) discloses a method for obtaining a colored polyetherimide fiber, the method including extruding a polyetherimide polymer to obtain a spun fiber and cheese-dyeing the spun fiber to give a dyed fiber.

SUMMARY OF THE INVENTION

Although Patent Document 1 discloses a polyetherimide fiber having excellent heat resistance, there is a problem that light-induced deterioration in color and tenacity has occurred in the polyetherimide fiber due to its molecular structure.

Patent Document 2 discloses a method for obtaining a spun-dyed polyetherimide fiber through cheese-dyeing, but never mentions obtaining a fiber having excellent light resistance.

On occasions where working outside at outdoor construction sites, automobile accident handling sites, and the like, as well as where guiding traffic and controlling traffic, there have been increasing demands for fiber products such as clothing that have flame-retardancy and light resistance, and are colored in a fluorescent color or the like to be highly visible for safety of the work.

In order to obtain a fiber suitable for such applications, the present inventors set an objective to provide a fiber that has excellent flame retardancy and is improved in light resistance and/or colorability and to provide a method for producing such a fiber in a simple way.

The present inventors also set another objective to provide a fabric that comprises such a fiber and a polymer composite material containing the fiber.

As a result of intensive studies conducted by the inventors according to the present invention to achieve the objectives described above, the present inventors have found that, a fiber having excellent flame retardancy and being improved in light resistance and/or colorability can be obtained by using a fiber-forming polymer comprising a polyetherimide polymer (A) and a thermoplastic polymer (B) having a specific relationship to the polyetherimide polymer (A), and by further incorporating a particular amount of a functional additive that provides light resistance and/or colorability into the fiber-forming polymer. Thus, the present invention has now been completed.

That is, a first aspect according to the present invention provides a flame-retardant fiber comprising a fiber-forming polymer, wherein the fiber-forming polymer comprises a polymer blend comprising a polyetherimide polymer (A) and a thermoplastic polymer (B) having a glass transition temperature lower than a glass transition temperature of the polymer (A);

the fiber-forming polymer further contains a functional additive (C) that provides light resistance, colorability, or both of light resistance and colorability, a mass ratio (A)/(B) of the polymer (A) to the polymer (B) is from 50/50 to 90/10, and a content of the functional additive (C) is from 0.5 to 10% by mass relative to 100% by mass of the total mass (A+B+C) of the polymer (A), the thermoplastic polymer (B), and the functional additive (C).

The polyetherimide polymer (A) comprises preferably an amorphous polyetherimide polymer having a molecular weight distribution (Mw/Mn) of less than 2.5. Regarding the molecular weight distribution Mw/Mn, Mw denotes a weight-average molecular weight and Mn denotes a number average molecular weight.

The fiber-forming polymer may have a glass transition temperature of 200° C. or lower.

The thermoplastic polymer (B) preferably comprises at least one polymer selected from the group consisting of a polyester polymer, a polycarbonate polymer, and a polyether ether ketone polymer. Preferably, the thermoplastic polymer (B) is completely compatible (miscible) with the polyetherimide polymer (A).

In particular, the thermoplastic polymer (B) may comprise a crystalline polyester polymer, and particularly preferably a crystalline polyethylene terephthalate polymer.

The functional additive (C) may be a compound that provides colorability and light resistance to the flame-retardant fiber, or the functional additive (C) may contain both a compound that provides colorability and a compound that provides light resistance. The functional additive (C) may be an inorganic and/or organic substance, and may be, for example, an organic pigment.

A second aspect according to the present invention provides a method for producing the flame-retardant fiber, wherein the flame-retardant fiber is formed from a fiber-forming polymer which comprises a polymer blend obtained by blending a polyetherimide polymer (A) and a thermoplastic polymer (B) having a glass transition temperature lower than a glass transition temperature of the polymer (A), the fiber-forming polymer further contains a functional additive (C) that provides light resistance, colorability, or both of light resistance and colorability, the mass ratio (A)/(B) of the polymer (A) to the polymer (B) is from 50/50 to 90/10, and the content of the functional additive (C) is from 0.5 to 10% by mass relative to 100% by mass of the total mass (A+B+C) of the polymer (A), the thermoplastic polymer (B), and the functional additive (C); and the method comprises:

(i) kneading the functional additive (C) into the polymer(s) [polymer (A) or polymer (B)] in advance and subjecting the resulting polymer to melt-spinning to produce a flame-retardant fiber, or (ii) performing a post-processing by impregnating a preliminarily formed fiber with the functional additive (C) to produce a flame-retardant fiber, or (iii) performing both of the (i) and (ii) for adding (giving) the functional additive (C) to a flame-retardant fiber.

Preferably, fiber formation is preferably carried out by mixing a part of the thermoplastic polymer (B) with the functional additive (C) to prepare a master batch and subjecting the master batch and the remaining fiber-forming polymer(s) to melt-kneading and subsequent melt-spinning.

For example, during the melt-spinning in the step (i), a spinning temperature may be from 300 to 400° C. During the impregnation in the step (ii), an impregnating temperature may be from 80 to 140° C.

A third aspect according to the present invention provides a flame-retardant fabric containing the flame-retardant fiber according to the first aspect according to the present invention.

A fourth aspect according to the present invention provides a polymer composite material at least comprising the flame-retardant fiber according to the first aspect according to the present invention and a reinforcing fiber.

According to the first aspect according to the present invention, by forming a fiber from a thermoplastic polymer containing a polyetherimide polymer and a specific thermoplastic polymer in a particular proportion, especially by forming the fiber using an amorphous polyetherimide polymer having a molecular weight distribution (Mw/Mn) less than 2.5 with incorporating into the fiber a particular amount, namely from 0.5 to 10% by mass, of a functional additive that provides light resistance and/or colorability, the obtained fiber has improved light resistance and/or colorability. As a result, a flame-retardant fiber having flame retardancy and light resistance and/or colorability can be obtained.

According to the second aspect according to the present invention, a flame-retardant fiber having flame retardancy and light resistance and/or colorability can be formed by kneading a functional additive that provides light resistance and/or colorability into a fiber-forming polymer and subsequently performing melt-spinning to form a fiber into which the functional additive has been kneaded; or by impregnating a preliminarily formed fiber containing a fiber-forming polymer with a functional additive that provides light resistance and/or colorability; preferably by mixing a part of the fiber-forming polymer with the functional additive so as to prepare a master batch and subjecting the master batch and the remaining fiber-forming polymer to melt-kneading and subsequent spinning. In particular, where preparing a master batch that is a polymer composition containing a functional additive, and then melt-kneading the master batch and a fiber-forming polymer(s), it is possible to form a fiber under substantially the same temperature as a temperature for allowing the fiber-forming polymer without the functional additive to be melted even if the melt-kneaded polymer material contains the functional additive in an amount of 0.5% by mass or greater.

According to the third aspect according to the present invention, the fabric containing the flame-retardant fiber according to the first aspect of the present invention can be a fabric suitable for applications where both flame retardancy and light resistance are required (such as curtains, bedding, protective clothing, and interior materials for buildings, automobiles, and the like).

According to the fourth aspect according to the present invention, the polymer composite material containing, as a matrix polymer, the flame-retardant fiber according to the first aspect of the present invention can be moldable at low temperatures and also can have advantages in flame retardancy and low smoke emission derived from a polyetherimide polymer.

It should be noted that any combination of at least two constructions, disclosed in the appended claims and/or the specification and/or the accompanying drawings should be construed as included within the scope according to the present invention. In particular, any combination of two or more of the appended claims should be equally construed as included within the scope according to the present invention.

DESCRIPTION OF EMBODIMENTS

A flame-retardant fiber according to the present invention comprises a fiber-forming polymer. The fiber-forming polymer comprises a polymer blend comprising a polyetherimide polymer (A) and a thermoplastic polymer (B) having a glass transition temperature lower than a glass transition temperature of the polymer (A), and a functional additive (C) that provides light resistance, colorability or both.

The fiber-forming polymer contains, where the total mass of a polymer (A), a thermoplastic polymer (B), and a functional additive (C) is regarded as (A+B+C=100% by mass), 0.5 to 10% by mass of the functional additive (C) that provides light resistance, colorability or both. It should be noted that, for the sake of simplicity, even where the functional additive (C) is added to a fiber after the fiber formation, since the functional additive (C) is dispersed in the fiber-forming polymer of the fiber, the quantity of the functional additives (C) is calculated as one of the contents in the fiber-forming polymer.

Polyetherimide Polymer

As the polyetherimide polymer used in the present invention (A), there may be exemplified a polymer comprising a combination of repeating structural units as shown below. In the formula, R1 represents a divalent aromatic residue having 6 to 30 carbon atoms, and R2 represents a divalent organic group selected from the group consisting of a divalent aromatic residue having 6 to 30 carbon atoms, an alkylene group having 2 to 20 carbon atoms, a cycloalkylene group having 2 to 20 carbon atoms, and a polydiorganosiloxane group in which the chain is terminated by an alkylene group having 2 to 8 carbon atoms.

[Chem. 1]

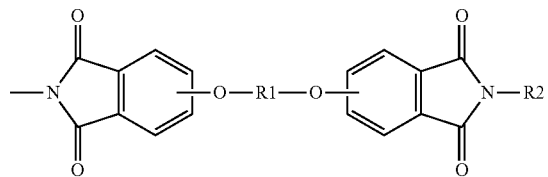

The preferable R1 and R2 include, for example, an aromatic residue and an alkylene group (e.g., m=2 to 10) shown in the following formulae.

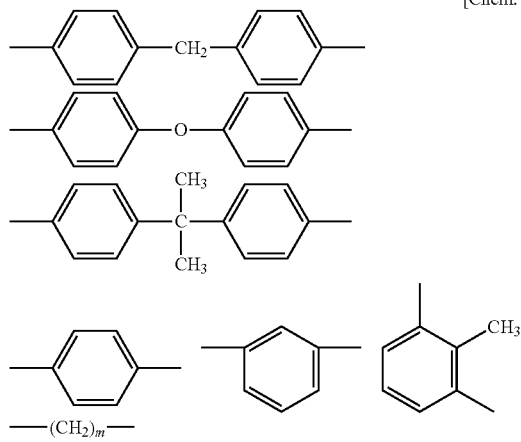

[Chem. 2]

In the present invention, from the viewpoint of an amorphous property, melt formability, and cost reduction, a preferable polymer includes a condensate of 2,2-bis[4-(2,3-dicarboxyphenoxy)phenyl]propane dianhydride and m-phenylenediamine, having a structural unit shown by the following formula as a main constituent. Such an amorphous polyetherimide is available from SABIC Innovative Plastics Holding under the trademark of "ULTEM".

The molecular weight of the polyetherimide polymer used in the present invention is not particularly limited to a specific one. In taking the mechanical property, dimensional stability, and processability of the fibers formed from the polymer into consideration, the polymer preferably has a melt viscosity of 5,000 poise or lower measured at the temperature of 390° C. and the shear rate of 1,200 sec$^{-1}$. From the above view, the polymer preferably has a weight-average molecular weight (Mw) of about 1,000 to about 80,000. Although it is desirable to use a polymer having a large molecular weight because such polymer is capable of forming fibers with an improved tenacity as well as being excellent in heat-resisting property, a polymer preferably has an Mw of 10,000 to 50,000 in view of cost required for polymer production and/or fiber forming.

The polyetherimide polymer used in the present invention preferably have a molecular weight distribution (Mw/Mn) of less than 2.5, which is the ratio of a weight-average molecular weight (Mw) relative to a number-average molecular weight (Mn) from the viewpoint of processability. The molecular weight distribution of the polymer is preferably within the range from about 1.0 to about 2.4, and more preferably within the range from 1.0 to 2.3. The polymer having such a small molecular weight distribution can be produced by the method, for example, described in the JP Laid-open Patent Publication No. 2007-503513, but the method is not limited to the above. It should be noted that the weight-average molecular weight (Mw), the number-average molecular weight (Mn), and the molecular weight distribution can be determined, for example, as the molecular weight of polystyrene by gel permeation chromatography (GPC) which is a kind of a size exclusion chromatography (SEC).

Thermoplastic Polymer

The thermoplastic polymer (B) used in the present invention is a polymer having a glass transition temperature lower than a glass transition temperature of the polyetherimide polymer (A), and is not limited to a specific one as long as the thermoplastic polymer (B) is blendable so as to obtain a polymer blend comprising the polymer (A) and the polymer (B), the polymer blend having a fiber-forming property.

As mentioned above, since such a thermoplastic polymer has a glass transition temperature lower than a glass transition temperature of the polyetherimide polymer, even if using a polyetherimide polymer conventionally requiring spinning or dyeing at higher temperatures, the thermoplastic polymer having a specific glass transition temperature can reduce the spinning and/or dyeing temperature required for a polymer blend comprising the thermoplastic polymer and the polyetherimide polymer. Further, the thermoplastic polymer having a specific glass transition temperature can suc-

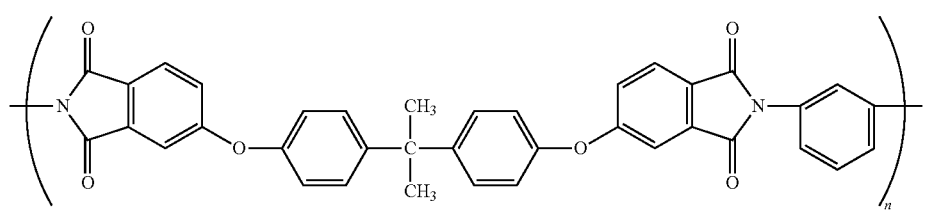

[Chem. 3]

cessfully impart, to a polyetherimide polymer having a rigid molecular structure, a functionality provided by a functional additive.

The thermoplastic polymer may have a glass transition temperature (Tg) of preferably, 160° C. or lower (for example, about from 50 to 160° C.), more preferably at 130° C. or lower, and further preferably 100° C. or lower. It should be noted that the glass transition temperature may indicate a value measured by the method described in Examples below.

Examples of preferred thermoplastic polymers include a polyester polymer (preferably a polyethylene terephthalate polymer, a polyethylene naphthalate polymer), a polycarbonate polymer, a polyether ether ketone polymer, and the like. Among them, more preferred thermoplastic polymers may include a polyester polymer or a polycarbonate polymer in terms of low glass transition temperature. The thermoplastic polymer may be especially preferably a crystalline polyester polymer excellent in thermal stability where used in combination with the polyetherimide polymer, and examples of those polymers include a crystalline polyethylene terephthalate polymer, a crystalline polyethylene naphthalate polymer, and especially a crystalline polyethylene terephthalate polymer.

The crystalline polyethylene terephthalate refers to a polyethylene terephthalate having a crystalline melting peak at around 255° C. in differential scanning calorimetry (DSC). The crystalline polyethylene terephthalate preferably has an intrinsic viscosity [η] of 0.5 to 0.8 in terms of spinnability.

By combining a polyetherimide polymer with a specific thermoplastic polymer, a fiber-forming polymer containing these polymers may have a glass transition temperature of, for example, 200° C. or lower (e.g., about 130 to 200° C.), preferably about 140 to 190° C., and more preferably about 150 to 180° C. According to the present invention, a specific fiber-forming polymer can achieve a glass transition temperature lower than a glass transition temperature of a polyetherimide polymer used alone. Accordingly, the fiber-forming polymer makes it possible to reduce a spinning temperature as well as a dyeing temperature thereof.

From the viewpoint of improving the blending property with the polyetherimide polymer (A), the thermoplastic polymer (B) is preferably a polymer having a complete compatible property with a polyetherimide polymer (A). In such a case, the molecular chains of the thermoplastic polymer (B) may be partially modified in a range which satisfies the complete compatible property.

It should be noted that the term "complete compatible property" here means a complete compatibility between a polyetherimide polymer (A) and a thermoplastic polymer (B) at a spinnable temperature (for example, room temperature to 450° C.). Such compatibility can be determined by confirming that a polymer blend have a single glass transition temperature in viscoelasticity measurement.

Functional Additives Capable of Providing Light Resistance, Colorability or Both The present inventors have found that, by using a polymer blend, as a fiber-forming polymer, comprising a polyetherimide polymer (A) and a thermoplastic polymer (B) having a glass transition temperature lower than a glass transition temperature of the polyetherimide polymer to be blended together, even where using a polyetherimide polymer, it is possible to reduce a spinning temperature and/or a dyeing temperature compared to the temperature which has been conventionally used, and that thanks to the specific fiber-forming polymer, 0.5 to 10% by mass of a colorant such as a dye or a pigment and/or an ultraviolet absorber can advantageously work as a functional additive (C) which can impart light resistance and/or colorability to the polyetherimide polymer.

The functional additive (C) is a compound being capable of providing light resistance, colorability or both. For example, the functional additive (C) may be a compound that provides only light resistance, may be a compound that provides only colorability, or may be a compound that provides both light resistance and colorability. Further as the functional additive (C), there may be used a combination of a compound that provides light resistance and a compound that provides colorability.

Examples of such functional additives may include various colorants such as dyes and pigments, ultraviolet absorbers, and the like.

Pigment

The pigment to be used as the functional additive (C) in the present invention can be those which are commercially available. Examples of the pigments may include organic pigments, for example, an azo pigment, an anthraquinone pigment, a quinacridone, a cyanine pigment such as a cyanine green and a cyanine blue, a dioxazine pigment, a phthalocyanine pigment such as an α-type phthalocyanine and a β-type phthalocyanine, a perinone pigment, a perylene pigment, an isoindolinone pigment, a polyazo pigment, and others; inorganic pigments, for example, a titanium yellow pigment, an ultramarine blue pigment, an iron oxide pigment, a zinc oxide pigment, an aluminum oxide pigment, an red iron pigment, a zinc white pigment, a titanium oxide pigment such as an anatase titanium oxide pigment and a rutile titanium oxide pigment, a carbon-based pigment such as a carbon black pigment, a graphite pigment, a spirit black pigment, a channel black and a furnace black pigment, a cadmium pigment such as a cadmium red pigment, a cadmium yellow pigment, a cadmium orange and the like. These pigments may be used alone or in combination of two or more thereof. Among these pigments, preferable one may include a pigment capable of imparting light resistance (e.g., titanium oxide pigments, iron oxide pigments, cadmium pigments, carbon-based pigments, phthalocyanine pigment, etc.) and an organic pigment capable of imparting a wide variety of colorability (e.g., perylene pigments, isoindolinone pigments, etc.)

Dye

The dye used as a functional additive according to the present invention may be any disperse dye as long as the dye is capable of dyeing a conventional polyester fiber or the like. In particular, as the suitable disperse dye for the flame-retardant fiber according to the present invention, there may be mentioned a disperse dye having good diffusion property, and tending to have a higher inorganic property in a ratio of inorganic/organic property. Typically used dyes may comprise a dye containing a hydroxyl group or a halogen atom. Examples of the dyes suitable for flame retardant fibers may include, specifically "Dianix Yellow E-3G", "Dianix Red E-FB", "Dianix Orange 2G-FS", "Dianix Blue 3RSF", "Dianix Blue S-2G", "Dianix Navy S-2G" all of which are manufactured by DyStar; "Kayalon Micro Yellow AQ-LE", "Kayalon Micro Red AQ-LE", and "Kayalon P Black ECX 300" all of which are manufactured by Nippon Kayaku Co., Ltd., and others. Some of the dyes mentioned above are capable of dyeing fibers successfully without a carrier. Usage of a carrier makes it possible to achieve deep shade and also improved washfastness. In addition, the species of dyes to be used in the present invention is not particularly limited to the above described dyes because usage of a carrier makes it possible to achieve successful dyeing for some of the dyes which do not achieve successful dyeing without a carrier.

Ultraviolet Absorber

As the ultraviolet absorber to be used as a functional additive (C) according to the present invention, there may be mentioned organic ultraviolet absorbers such as a triazine compound, a benzophenone compound and a benzotriazole compound, inorganic ultraviolet absorbers such as titanium oxide and cerium oxide, and the like. These ultraviolet absorbers may be used alone or in combination of two or more. Preferred ultraviolet absorbers include triazine type ultraviolet absorber from the standpoint of having excellent heat resistance and light resistance, and a cerium-type ultraviolet absorber from the standpoint of having resistance to deactivation. It is preferable to use an ultraviolet absorber in a state of being dissolved or dispersed in water or an organic solvent to be mixed with a polymer so that the ultraviolet absorber can be uniformly dispersed in an emulsion or solution of the above-described polymer. In addition, in order to use an ultraviolet absorber in combination with a dye, there may be used a dyeing auxiliary containing an ultraviolet absorbent, for example Briand FOK-3 (produced by Matsumoto Yushi-Seiyaku Co., Ltd.).

Mass Ratio of Each Component in Flame Retardant the Fiber

In the flame-retardant fiber, the mass ratio (A)/(B) of the polyetherimide polymer (A) to thermoplastic polymer (B) is 50/50 to 90/10, and may be preferably about 55/45 to about 85/15, and more preferably about 60/40 to about 80/10. Where the ratio of the polymer (A) is too low, there is a possibility that the fiber cannot exhibit sufficient flame retardancy. On the other hand, where the ratio of the polymer (B) is too low, there is a possibility that too high spinning temperature reduce spinnability or causes insufficient light resistance and/or coloring in the flame-retardant fiber.

Furthermore, where the total amount of the polyetherimide polymer (A), the thermoplastic polymer (B) and the functional additive (C) denoted as (A+B+C) is regarded as 100% by mass, the amount (in terms of solid content) of a functional additive(s) (a pigment, a dye, an ultraviolet absorber, etc.) to be added is in the range of 0.5 to 10% by mass. Where the amount of the functional additive is too low, the resultant fiber may fail to have improved light resistance because of insufficient shielding effect against ultraviolet light, or may have unsatisfactory colorability. Meanwhile, although light resistance and colorability of fiber improve with an increase of the amount of the functional additive, the amount exceeding 10% by mass may be economically unsatisfied because of saturation of the effect. Such high amount of the functional additive may reduce the mechanical properties of the fibers. The amount of the functional additive (C) relative to the total amount of (A+B+C) may be about 5 to 10% by mass.

Various Additives Other Than Functional Additives

If necessary, into the fiber-forming polymer according to the present invention, there may be added an additive such as an antioxidant and a light stabilizer which can be used in combination with the above-mentioned ultraviolet absorber. An inorganic substance such as kaolin, silica and barium oxide may be added to the fiber-forming polymer.

Fiber-Forming Method

The method for forming fibers will be described. Fibers can be formed by melt-spinning a fiber-forming polymer. The functional additive (C) can be used alone or in combination of two or more. For example, the fiber-forming method may comprise: (i) melt-extruding a polymer and a functional additive (C) together so as to carry out melt-spinning; and/or (ii) applying a functional additive (C) to a preliminarily prepared fiber.

As a method for adding the functional additive, in the above method (i) where the mass dyeing (dope-dyeing) is carried out, for example, a functional additive (a pigment, an ultraviolet absorber, or the like) may be melt-kneaded into the polymer in advance, and the melt-kneaded mixture is subject to melt-spinning using a single-screw or twin-crew extruder to obtain a flame-retardant fiber.

Also, in the above method (ii), for example, after fiber formation, the fiber is impregnated in an immersing bath (or dyebath) containing a functional additive (a dye and/or an ultraviolet absorber) as post-processing so as to obtain a flame-retardant fiber containing the functional additive (C).

In the above method (i) (mass dyeing), the method for forming a fiber comprises: for example, melt-kneading a fiber-forming polymer with adding a functional additive such as a pigment and an ultraviolet absorber, or melt-kneading a polymer composition containing a fiber-forming polymer and a functional additive such as a pigment and an ultraviolet absorber to obtain a molten polymer mixture; extruded the molten polymer mixture through a spinneret at a predetermined temperature; and winding as-spun yarns at a predetermined taking-up speed (or spinning speed).

More specifically, where the functional additive and the polymer are kneaded together, it is preferred that a part of a fiber-forming polymer (particularly a thermoplastic polymer (B)) is melt-kneaded with a functional additive (a pigment, an ultraviolet absorber, etc.) to give a master batch, and that the master batch is melt-kneaded with the remaining fiber-forming polymer because the melt-extrusion temperature can be reduced compared to the melt-extruding temperature required for kneading the functional additive (C) with the entire amount of fiber-forming polymer. As the master batch, a pellet containing either a polyetherimide polymer (A) or a thermoplastic polymer (B), and a higher concentration (0.2 to 60% by mass) of a functional additive can be prepared. Subsequently the pellet was melt-kneaded with the remaining polyetherimide polymer (A) and thermoplastic polymer (B) so as to allow a predetermined ratio of the functional additive (C) to be formulated.

It should be noted that where a wound yarn after extrusion already has a desired fineness in the winding stage, the yarn can be used without drawing. The term "drawing" here means a process in which a yarn once wound up or quenched after melt spinning is drawn (stretched) with the use of tension members, such as rollers; and the term "drawing" does not include a process in which as-spun yarn discharged from spinning nozzle is extended until winding.

The extruding temperature (or spinning temperature) may be, for example, about 300 to 400° C., preferably about 310 to 350° C., and more preferably about 320 to 340° C.

According to the present invention, usage of a fiber-forming polymer with a specific blend formulation enables to reduce the melt-extrusion temperature, whereby it is possible to adopt a variety of functional additives (particularly organic pigments, etc.) which used to be impossible to adopt because of intolerance to high melt-kneading temperature conventionally required for polyetherimide polymers.

The hole diameter (single hole) of the spinneret may be, for example, about 0.05 to about 10.0 mm (e.g., about 0.1 to about 10.0 mm diameter), preferably about 0.1 to about 5.0 mm, and more preferably about 0.1 to about 3.0 mm. In addition, the configuration of the hole may be suitably selected according to a required fiber configuration in the cross section.

The winding speed of the yarn (spinning speed) can be suitably decided depending on the hole size of the spinneret, or the extruded amount, from the viewpoint of preventing molecule orientation in the longitudinal direction of the yarn, the winding speed may be within a range from 300 m/min. to 3,000 m/min., preferably within a range from 500 m/min. to 2,500 m/min., and more preferably within a range from 1,000 m/min. to 2,000 m/min.

Too slow spinning speed may be undesirable in view of obtaining the fibers (in particular, fibers with fine fineness) without drawing if possible, while too high spinning speed may be undesirable since highly oriented molecules in the flame-retardant fiber may cause shrinkage at high temperatures and such a fiber may easily cause fiber-breakage during spinning.

In the above method (ii) (post-processing application of the functional additive), for example, after fiber formation, in order to impregnate the fiber so as to allow a functional additive to be contained in the fiber by post-processing procedure, the post-processing procedure can comprise dissolving or dispersing the functional additive (dye, ultraviolet absorbing agent, etc.) in water, and treating the fiber to be impregnated in the solution or dispersion at a predetermined temperature to obtain the impregnated fiber containing the functional additive.

In particular, where the functional additive is a dye, the functional additive imparting colorability may be impregnated in the fiber in a dyebath during dyeing process. In such a case, the dyeing temperature in the dyebath may be set in a preferable range depending on the desired dyeing concentration, the type of a dyestuff, presence or absence of a carrier (such as a phthalimide), and others. For example, the dyeing temperature may be about 80 to 140° C., preferably about 100 to 130° C., and more preferably about 110 to 120° C.

According to the present invention, by combining a polyetherimide polymer (A) with a thermoplastic polymer (B) having a glass transition temperature lower than a glass transition temperature of the polymer (A), the glass transition temperature of a polymer blend containing the polyetherimide polymer (A) can be reduced. As a result, as compared with using the polyetherimide polymer (A) alone, a dyeing temperature for the blend fiber can be reduced.

In particular, since the post-dyeing processing enables a dye to penetrate into the fiber as well as suppresses light-induced fading and change in color of the fiber, it is preferable to contain the dye in an enhanced amount. In general, a large amount of dye requires increasing a dyeing temperature, but since the specific blend fiber used in the present invention makes it possible to lower the dyeing temperature, even when the fiber contains a large amount of dye, it is possible to prevent the reduction of fiber tenacity caused by exposure to the high dyeing temperature.

It should be noted that after dyeing process, if necessary, other appropriate known process (scouring step, washing step, and color developing process) performed in the dyeing may be carried out.

Flame-Retardant Fiber

The flame-retardant fiber according to the present invention is excellent in flame retardancy, and for example, may have a limiting oxygen index value (LOI value) of 25 or higher, preferably 26 or higher, and more preferably 27 or higher. Further, higher limiting oxygen index value is more preferred, but is 40 or lower in many cases. In addition, the limiting oxygen index value referred to herein is a value measured by the method described in Examples below.

The flame-retardant fiber according to the present invention may have, for example as a single fiber fineness, a wide range of from 0.1 to 1000 dtex in which a fiber contains a functional additive (C) in a predetermined amount. Preferably, the fiber has a single fiber fineness of 0.3 to 20 dtex, and more preferably 1 to 15 dtex.

Further, the flame-retardant fiber according to the present invention may be a fiber having a small fineness. Where the fiber has a small fineness, the single fiber fineness may be, for example, 0.1 to 10 dtex, preferably 0.3 to 7 dtex, and more preferably 0.5 to 5 dtex.

The flame-retardant fiber according to the present invention preferably has a fiber tenacity (fiber strength) at room temperature of 1.0 cN/dtex or higher. Where the fiber tenacity is too low, it is not preferred because processability for producing a paper or a fabric such as a nonwoven fabric or textile may be deteriorated, as well as the use will be limited. More preferably, the fiber has a tenacity of 1.3 to 4.0 cN/dtex, and further preferably 1.6 to 3.0 cN/dtex. It should be noted that the fiber tenacity is a value measured by the method described in Examples below.

Further, the flame-retardant fiber according to the present invention preferably has high light resistance. In such a case, the fiber may have a tenacity retention percentage of 75% or higher, preferably 78% or higher, and more preferably 80% or higher after irradiating the fiber for 10 hours using a carbon fade apparatus. It should be noted that the tenacity retention percentage indicates a value measured by the method described in Examples below.

The flame-retardant fiber according to the present invention also can suppress shrinkage under dry heat (dry thermal shrinkage percentage). For example, the shrinkage percentage under dry heat may be about 0.1 to 3%, more preferably 0.5 to 2.5%, and more preferably about 0.8 to 2%. Here, the shrinkage percentage under dry heat indicates a value measured by the method described in Examples below.

The flame-retardant fiber according to the present invention has low smoke emission, for example, and can achieve a smoke density Ds (at 4 minutes) of 200 or less, preferably 100 or less, and more preferably 75 or less in accordance with ASTM E662. The lower limit value of the smoke density Ds is not particularly limited, and for example, may be about 5. Here, the smoke density Ds indicates the value measured by the method described in Examples below.

Fabric

The flame-retardant fiber obtained by the present invention can be suitably used for a variety of fabrics such as woven fabrics, knitted fabrics, and nonwoven fabrics.

The flame-retardant fiber according to the present invention which is improved in light resistance, and fabrics using the flame-retardant fiber can be widely used as curtains, beddings, shrouds, protective clothing, and interior materials for buildings, automobiles, ships, airplanes, and others.

Polymer Composite Material

A polymer composite material (resin composite material) can be obtained which comprises at least a flame-retardant fiber according to the present invention and a reinforcing fiber. Such a polymer composite material can be molded by a known or conventional method so as to obtain a polymer composite (polymer molded body).

Such polymer composite materials or composites can be a material being moldable at relatively low temperatures as well as excellent in flame retardancy and having low smoke emission.

The polymer composite material is characterized by containing a matrix polymer component comprising a flame-retardant fiber according to the present invention. For example, the polymer composite material can be obtained by mixing flame retardant chopped fibers (short cut fibers) according to the present invention and reinforcing chopped fibers with each other, and subjecting the mixture to paper-making so as to obtain a polymer composite material. Alternatively, a fabric of flame-retardant fibers according to the present invention is laminated to a fabric or sheet of reinforcing fibers with each other in layers, and subjecting the laminate to heating so as to obtain a composite material.

The reinforcing fiber is not limited to a specific one as long as it does not impair the effects according to the present invention. Examples of the reinforcing fibers may include any of a carbon fiber, a glass fiber, a wholly aromatic aramid fiber, a wholly aromatic polyester fiber, and a benzazole fiber. These reinforcing fibers may be used alone or in combination.

Furthermore, the polymer composite material according to the present invention may be used in combination with a matrix polymer component, or, as a binder component, a thermosetting polymer or a thermoplastic polymer.

In such a case, a polymer composite material may comprise chopped reinforcing fibers and chopped flame retardant fibers both of which are dispersed in a matrix polymer component and/or a binder component; or a polymer composite material may comprise a fabric-shaped substrate formed of reinforcing fibers impregnated with a matrix polymer component and/or binder component comprising flame retardant fibers.

Examples of the thermosetting polymers include an epoxy polymer, a vinyl ester polymer, an unsaturated polyester polymer, a cross-linked methacrylic polymer, a phenolic polymer, a urea polymer, a melamine polymer, a diallyl phthalate polymer, a furan polymer, a silicone polymer, and the like. These polymers may be used alone or in combination of two or more.

Examples of the thermoplastic polymers include a polyester polymer, a polyamide, a styrenic polymers, a (meth) acrylic polymer, a polyether, a polycarbonate, an ionomer polymer, a thermoplastic elastomer, and others. These thermoplastic polymers may be used alone or in combination.

In the polymer composite material or polymer composite according to the present invention, a ratio of the reinforcing fiber relative to the flame retardant fiber can be determined depending on the form of the composite material, and may be about, for example, (reinforcing fiber)/(flame retardant fiber)=5/95 to 60/40, preferably about 10/90 to about 50/50, and more preferably about 20/80 to about 40/60.

The polymer composite material obtained as described above can be molded at low temperatures, and excellent in flame retardancy and low smoke emission. For example, the polymer composite material can achieve to have a molding temperature of 300° C. or lower, satisfy UL94 V-0 standard as a flame retardancy, and have an ASTM E662 smoke density Ds (at 4 minutes) of 200 or less.

The polymer composite material according to the present invention can be suitably used as interior materials for transport equipment such as aircrafts, trains, ships, as well as housings, hospitals, and school buildings.

EXAMPLES

Hereinafter, the present invention will be demonstrated by way of some examples that are presented only for the sake of illustration, which are not to be construed as limiting the scope according to the present invention. It should be noted that in the following Examples, fiber tenacity, dry heat shrinkage percentage, limiting oxygen index, processability for making fibers, glass transition temperature, and light resistance were evaluated in the following manners.

Fiber Tenacity (cN/dtex)

The tenacity of each of the samples having a fiber length of 20 cm was measured in accordance with the JIS L1013, in which the preconditioned yarn was measured at the room temperature (25° C.) under the initial load of 0.25 cN/dtex, and a tension speed of 50%/minute, and the average of 20 samples (n=20) was adopted. Moreover, the fiber fineness (dtex) of each sample was measured by a mass method.

Shrinkage Percentage Under Dry Heat (%)

Fiber samples each having 10 cm length or fabric samples each having 10 cm×10 cm square were placed for 10 minutes in an air thermostat at a temperature of 160° C. in the state where terminals of the samples were not fixed, and then the lengths of the samples were measured. The shrinkage percentages under dry heat of the samples were calculated in the following formula using the fiber or fabric length (X):

$$\text{Shrinkage percentage under dry heat (\%)} = <(10-X)/10> \times 100$$

Limiting Oxygen Index Value (LOI Value)

Samples each tied into a braid and having a length of 18 cm were prepared. According to JIS K7201, after igniting the upper portion of the samples, the minimum oxygen concentration required for the samples to keep burning for at least 3 minutes or alternatively to be burned until the burning length of the sample became at least 5 cm was determined. The average of 3 samples (n=3) was adopted.

[Glass Transition Temperature (Tg) ° C.]

The glass transition temperature of fiber samples was calculated from the peak temperature by using a solid viscoelasticity measuring device "Rheospectra DVE-V4" produced by Rheology Co. to measure temperature dependency of loss tangent (tan δ) in the frequency of 10 Hz and by heating at an elevating temperature of 10° C./min.

Light Resistance Evaluation

Fiber samples were irradiated for 10 hours with a carbon fade apparatus, and evaluate a tenacity retention percentage of the irradiated samples relative to the tenacity before light irradiation as 100%.

Smoke Density Ds

In accordance with ASTM E662, a tubular net fabric from sample fibers were prepared having a basis weight of about 290 g/m² to measure a smoke density Ds (at 4 minutes).

Evaluation of Colorability

With respect to color vividness of a colored fabric, a sensory evaluation was carried out by 10 panelists. The vividness was evaluated by each panelist in accordance with the following criteria: giving 2 points for excellent, 1 point for good, and 0 point for poor. Total score of 10 panelists were used to evaluate the sample in accordance with the following three criteria:

A: Total score of 15 to 20 points.
B: Total score of 6 to 14 points.
C: Total score of 5 points or less.

Example 1

Using a twin-screw extruder, were melt-kneaded and extruded 47.5 parts by mass of a polyethylene terephthalate polymer (a crystalline polyethylene terephthalate having [η]=0.6 and Tg=69° C.) manufactured by Tainan Spinning Co., Ltd, (hereafter abbreviated as C-PET polymer), 2.5 parts by mass of a C-PET-based master batch containing 20% of a carbon black pigment, and 50 parts by mass of a polyetherimide polymer ("ULTEM 9011" manufactured by SABIC Innovative Plastics Holding, an amorphous polyetherimide polymer having a weight-average molecular weight (Mw) of 32,000, a number-average molecular weight (Mn) of 14,500 and a molecular weight distribution (Mw/Mn) of 2.2) (hereinafter abbreviated as U-PEI polymer). After metering through a gear pump, the molten polymer was discharged from a spinneret having a hole diameter of 0.2 mm at 340° C. As-spun yarns were wound at a rate of 1,500 m/min. to obtain multi-filaments (84 dtex/24 f). Thus obtained blend fibers had a polymer ratio (U-PEI polymer/C-PET polymer) of 50/50 (mass ratio) and a glass transition temperature of 170° C., and contained 0.5% by mass of the pigment as a functional additive.

Example 2

Using a twin-screw extruder, were melt-kneaded and extruded 25 parts by mass of a C-PET-based master batch containing 20% of Thinuvin1600 [ultraviolet absorber] (manufactured by BASF) and 75 parts by mass of a U-PEI polymer. After metering through a gear pump, the molten polymer was discharged from a spinneret having a hole diameter of 0.2 mm at 350° C. As-spun yarns were wound at a rate of 1,500 m/min. to obtain multi-filaments (84 dtex/24 f). Thus obtained blend fibers had a polymer ratio (U-PEI polymer/C-PET polymer) of 79/21 (mass ratio) and a glass transition temperature of 174° C., and contained 5% by mass of the ultraviolet absorber as a functional additive.

Example 3

Using a twin-screw extruder, were melt-kneaded and extruded 15 parts by mass of a C-PET-based master batch containing 20% of Thinuvin1600 [ultraviolet absorber] (manufactured by BASF), 10 parts by mass of a master batch containing 20% of perylene pigment, and 75 parts by mass of a U-PEI polymer. After metering through a gear pump, the molten polymer was discharged from a spinneret having a hole diameter of 0.2 mm at 350° C. As-spun yarns were wound at a rate of 1,500 m/min. to obtain multi-filaments (84 dtex/24 f). Thus obtained blend fibers had a polymer ratio (U-PEI polymer/C-PET polymer) of 79/21 (mass ratio) and a glass transition temperature of 176° C., and contained 3% by mass of the pigment and 2% by mass of the ultraviolet absorber as functional additives.

Example 4

Using a twin-screw extruder, were melt-kneaded and extruded 25 parts by mass of a C-PET polymer and 75 parts by mass of a U-PEI polymer. After metering through a gear pump, the molten polymer was discharged from a spinneret having a hole diameter of 0.2 mm at 350° C. As-spun yarns were wound at a rate of 1,500 m/min. to obtain multi-filaments (84 dtex/24 f). A tubular knitted fabric from thus obtained fibers was placed in a sealable pressure-resistant stainless steel vessel together with a dyeing solution containing a dyeing agent, a dyeing auxiliary including ultraviolet absorber, and others described below, and carried out dyeing for 40 minutes at 115° C. The dyed fabric was subjected to reduction cleaning for 20 minutes at 80° C. in a reduction cleaning bath as described below so as to remove impurities on the fiber surfaces. Thus obtained fibers had a polymer ratio (U-PEI polymer/C-PET polymer) of 75/25 (mass ratio) and a glass transition temperature of 170° C., and contained 3% by mass of the dye and 5% by mass of the ultraviolet absorber as functional additives.

Dye Formulation and Liquid Volume

Tubular knitted fabric: 7 g
Ultra MT level [pH adjusting agent] (manufactured by Mitejima Chemical Co., Ltd.): 1 g/L
Disper TL [dye dispersant (manufactured by Nicca Chemical Co., Ltd.): 1 g/L
Disperse Brilliant Orange CV-N [dye] (manufactured by Nikka Fine Techno Co., Ltd.): 3.0% owf
Briand FOK-3 [dyeing auxiliary including ultraviolet absorber] (manufactured by Matsumoto Yushi-Seiyaku Co., Ltd.): 5% owf
TN-55 [career] (manufactured by Yamato Chemical Co., Ltd.): 4% owf
Total liquid volume: 210 cc

Formulation of Reduced Cleaning Solution

Sodium carbonate: 1 g/L
Hydrosulfite: 1 g/L
Amirajin D (manufactured by Dai-ichi Kogyo Seiyaku Co., Ltd.): 1 g/L
Liquid volume: 200 cc

Example 5

Using a twin-screw extruder, were melt-kneaded and extruded 22.5 parts by mass of a polyethylene naphthalate polymer ("Teonex (registered trademark) 6G07 FS205Z" manufactured by TEIJIN LIMITED, a crystalline polyethylene naphthalate having Tg=126° C.) (hereafter abbreviated as C-PEN polymer), 2.5 parts by mass of a C-PEN-based master batch containing 20% of a carbon black pigment, and 75 parts by mass of a U-PEI polymer. After metering through a gear pump, the molten polymer was discharged from a spinneret having a hole diameter of 0.2 mm at 360° C. As-spun yarns were wound at a rate of 1,500 m/min. to obtain multi-filaments (84 dtex/24 f). Thus obtained blend fibers had a polymer ratio (U-PEI polymer/C-PEN polymer) of 75/25 (mass ratio) and a glass transition temperature of 193° C., and contained 0.5% by mass of the pigment as a functional additive.

Comparative Example 1

Using a twin-screw extruder, were melt-kneaded and extruded 5 parts by mass of a C-PET polymer and 95 parts by mass of a U-PEI polymer. After metering through a gear pump, the molten polymer was discharged from a spinneret having a hole diameter of 0.2 mm at 390° C. and tried to obtain as-spun yarns to be wound at a rate of 1,500 m/min. However, because of severe degradation of the extruded polymer at a high temperature due to too small amount of the C-PET polymer, it was impossible to obtain as-spun yarns.

Comparative Example 2

Using a twin-screw extruder, were melt-kneaded and extruded 50 parts by mass of a C-PET-based master batch containing 10% of Thinuvin1600 [ultraviolet absorber] (manufactured by BASF) and 10 parts by mass of a C-PET polymer, and 40 parts by mass of a U-PEI polymer. After metering through a gear pump, the molten polymer was discharged from a spinneret having a hole diameter of 0.2 mm at 300° C. As-spun yarns were wound at a rate of 1,500 m/min. to obtain multi-filaments (84 dtex/24 f). Thus obtained blend fibers had a polymer ratio (U-PEI polymer/C-PET polymer) of 95/5 (mass ratio) and a glass transition temperature of 120° C., and contained 5% by mass of the ultraviolet absorber as a functional additive.

Comparative Example 3

Using a single-screw extruder, 100% of a U-PEI polymer was melt-kneaded and extruded. After metering through a gear pump, the molten polymer was discharged from a spinneret having a hole diameter of 0.2 mm at 400° C. As-spun yarns were wound at a rate of 1,500 m/min. to Dye Formulation and Liquid Volume Tubular knitted fabric: 7 g
Ultra MT level [pH adjusting agent] (manufactured by Mitejima Chemical Co., Ltd.): 1 g/L
Disper TL [dye dispersant (manufactured by Nicca Chemical Co., Ltd.): 1 g/L
Reform Brilliant Orange CV-N [dye] (manufactured by Nikka Fine Techno Co., Ltd.): 3.0% owf
Briand FOK-3 [dyeing auxiliary including ultraviolet absorber] (manufactured by Matsumoto Yushi-Seiyaku Co., Ltd.): 5% owf
TN-55 [career] (manufactured by Yamato Chemical Co., Ltd.): 4% owf
Total liquid volume: 210 cc Formulation of Reduced Cleaning Solution Sodium carbonate: 1 g/L
Hydrosulfite: 1 g/L
Amirajin D (manufactured by Dai-ichi Kogyo Seiyaku Co., Ltd.): 1 g/L
Liquid volume: 200 cc
Table 1 shows the evaluation results of the fibers obtained in Examples 1 to 5 and Comparative Examples 1 to 4.

TABLE 1

| | Formulation of fiber-forming polymer | Functional additive (C) | | Tg | Tenacity | Shrinkage under dry heat | | Light resistance | Smoke density | |
|---|---|---|---|---|---|---|---|---|---|---|
| | Mass ratio (A)/(B) | Species[1] | (mass %)[2] | (° C.) | (cN/dtex) | (%) | LOI | (%) | (Ds) | Colorability |
| Example 1 | U-PEI/C-PET = 50/50 | Pig. 1 | 0.5 | 170 | 1.8 | 1.8 | 28 | 88 | 69 | —[3] |
| Example 2 | U-PEI/C-PET = 79/21 | UV absor. 1 | 5 | 174 | 1.8 | 1.6 | 28 | 82 | 40 | — |
| Example 3 | U-PEI/C-PET = 79/21 | Pig. 2 + UV absor. 1 | 3 + 2 | 176 | 1.9 | 1.6 | 29 | 89 | 44 | A |
| Example 4 | U-PEI/C-PET = 75/25 | Dye 1 + UV absor. 2 | 3 + 5 | 170 | 1.0 | 1.8 | 28 | 90 | 50 | A |
| Example 5 | U-PEI/C-PEN = 75/25 | Pig. 1 | 0.5 | 193 | 1.4 | 1.0 | 30 | 85 | 53 | —[3] |
| Comparative Example 1 | U-PEI/C-PET = 95/5 | — | 0 | | | | Unspinnable | | | |
| Comparative Example 2 | U-PEI/C-PET = 42/58 | UV absor. 1 | 5 | 120 | 2.2 | 48 | Melt-dropped | 82 | 80 | — |
| Comparative Example 3 | U-PEI | — | 0 | 217 | 2.7 | 0.3 | 31 | 44 | 8 | — |
| Comparative Example 4 | U-PEI | Dye 2 + UV absor. 2 | 3 + 5 | 217 | 1.5 | 0.3 | 31 | 60 | 10 | C |

[1] The species of the functional additives are as follows: Pig. 1: carbon black, Pig. 2: perylene pigment, UV absor. 1: Thinuvin 1600, UV absor. 2: Briand FOK-3, Dye 1: Disperse Brilliant Orange CV-N, and Dye 2: Reform Brilliant Orange CV-N
[2] Mass % shows a proportion of the functional additive (C) based on the total amount of A + B + C as 100.
[3] Not evaluated because of black color from carbon black.

obtain multi-filaments (84 dtex/24 f). Thus obtained U-PEI fibers had a glass transition temperature of 217° C.

Comparative Example 4

A tubular knitted fabric of the fibers obtained in Comparative Example 3 was placed in a sealable pressure-resistant stainless steel vessel together with a dyeing solution containing a dyeing agent, a dyeing auxiliary including an ultraviolet absorber, and others described below, and carried out dyeing for 40 minutes at 115° C. The dyed fabric was subjected to reduction cleaning for 20 minutes at 80° C. in a reduction cleaning bath as described below so as to remove impurities on the fiber surfaces. Thus obtained fibers from the U-PEI polymer had a glass transition temperature of 217° C., and contained 3% by mass of the dye and 5% by mass of the ultraviolet absorber as functional additives.

As is clear from Table 1, where the content of the polyethylene terephthalate polymer was too low (Comparative Example 1), it was impossible to lower the kneading and spinning temperature of the blend polymer. Accordingly, the blend polymer was tried to be spun in conformity to the temperature for the polyetherimide polymer, but probably because of too high spinning temperature for the polyethylene terephthalate polymer, the blended polymer was severely degraded and failed to obtain spun fibers.

In contrast, where the content of the polyethylene terephthalate polymer was too high (Comparative Example 2), the obtained fiber caused melt-dripping and was insufficient in terms of flame retardancy. Accordingly this case also could not obtain fibers achieving both flame retardancy and light resistance.

Further, in the case of fibers made of the polyetherimide polymer as a single-used polymer (Comparative Examples 3 and 4), although it was possible to obtain spun fibers, the obtained fibers in Comparative Examples 3 and 4 did not have satisfied light resistance and it was not possible to obtain fibers achieving both flame retardancy and light resistance.

In particular, where dyeing the fiber made of the polyetherimide polymer as a single-used polymer (Comparative Example 4), the obtained fiber was inferior in colorability.

On the other hand, all of Examples 1 to 5 enabled to lower the glass transition temperatures of the fiber-forming polymers compared to single use of polyetherimide polymer. Accordingly, it is possible to reduce a temperature for incorporating a functional additive during fiber forming procedure. Further, all fibers obtained in Examples 1 to 5 had high flame retardancy, especially achieved high level of flame retardancy of LOI=26 or higher which is the measure whether the fibers were determined as self-extinguishing fibers.

Furthermore, as for the functional properties such as light resistance, Examples 1 to 5 could show good functionality as compared with Comparative Examples. As for colorability, Examples 3 and 4 showed that the resulting fibers were excellent in colorability. Furthermore, the fibers obtained in Examples 1 to 5 were superior in terms of low smoke emission.

INDUSTRIAL APPLICABILITY

Since the fiber according to the present invention obtained from a polyetherimide polymer as a main component has fire retardancy and improved light resistance, the fiber can be used as curtains, bedding, protective clothing, and interior materials for buildings, transportations, and others, and has industrial applicability in fields such as manufacturing and processing of the fibers.

Further, a polymer composite material comprising the flame-retardant fibers, since the flame-retardant fiber can be used as a matrix polymer, even having moldability at low temperatures, the polymer composite material is excellent in flame retardancy and low smoke emission. Accordingly, the polymer composite material can be suitably used as transporting machines such as aircrafts, railway vehicles, ships, as well as interior materials for buildings such as housings, hospitals and schools, and others.

As described above, it has been described preferred embodiments according to the present invention, those skilled in the art, looking at this specification, it will readily envision various changes and modifications within the obvious range. Accordingly, such changes and modifications are construed as within the scope of the invention as defined from the scope of the claims.

What is claimed is:

1. A flame-retardant fiber comprising:
a polymer blend comprising:
a polyetherimide (A); and
a thermoplastic polymer (B) having a glass transition temperature lower than the glass transition temperature of the polyetherimide (A) and selected from the group consisting of a crystalline polyester, a polycarbonate, a polyether ether ketone and mixture thereof; and
a functional additive (C) that provides light resistance, colorability, or both of light resistance and colorability, wherein
the mass ratio (A)/(B) of the polyetherimide (A) to the thermoplastic polymer (B) is from 50/50 to 90/10, and
the content of the functional additive (C) is from 0.5 to 10% by mass relative to 100% by mass of the total mass of the polyetherimide (A), the thermoplastic polymer (B), and the functional additive (C).

2. The flame-retardant fiber as claimed in claim 1, wherein the polyetherimide (A) comprises an amorphous polyetherimide having a molecular weight distribution (Mw/Mn) of less than 2.5.

3. The flame-retardant fiber as claimed in claim 1, wherein the polymer blend has a glass transition temperature of 200° C. or lower.

4. The flame-retardant fiber as claimed in claim 1, wherein the thermoplastic polymer (B) is completely compatible with the polyetherimide (A).

5. The flame-retardant fiber as claimed in claim 1, wherein the thermoplastic polymer (B) comprises a crystalline polyester.

6. The flame-retardant fiber as claimed in claim 1, wherein the thermoplastic polymer (B) comprises a crystalline polyethylene terephthalate.

7. The flame-retardant fiber as claimed in claim 1, wherein the functional additive (C) is a compound that provides colorability and light resistance to the flame-retardant fiber, or the functional additive (C) comprises both a compound that provides colorability and a compound that provides light resistance.

8. The flame-retardant fiber as claimed in claim 1, wherein the functional additive (C) comprises an inorganic and/or organic substance.

9. The flame-retardant fiber as claimed in claim 1, wherein the functional additive (C) comprises an organic pigment.

10. A flame-retardant fabric containing the flame-retardant fiber recited in claim 1.

11. A polymer composite material comprising the flame-retardant fiber recited in claim 1, and a reinforcing fiber.

12. The flame-retardant fiber as claimed in claim 1, wherein the polymer blend has a glass transition temperature of from 140 to 190° C.

13. The flame-retardant fiber as claimed in claim 1, wherein the polymer blend has a glass transition temperature of from 150 to 180° C.

14. A method for producing a flame-retardant fiber, comprising:
blending a polyetherimide (A) and a thermoplastic polymer (B), the thermoplastic polymer (B) having a glass transition temperature lower than the glass transition temperature of the polyetherimide (A) and selected from the group consisting of a crystalline polyester, a polycarbonate, a polyether ether ketone and mixtures thereof, to obtain a polymer blend; and
subjecting the polymer blend to melt-spinning to form a fiber,
the method further comprising at least one of:
kneading a functional additive (C) that provides light resistance, colorability, or both of light resistance and colorability, into the polyetherimide (A), the thermoplastic polymer (B), and/or the polymer blend before the subjecting of the polymer blend to melt-spinning; and
impregnating the fiber with the functional additive (C) after the subjecting of the polymer blend to melt-spinning,
wherein the mass ratio (A)/(B) of the polyetherimide (A) to the thermoplastic polymer (B) is from 50/50 to 90/10, and
the amount of the functional additive (C) included in the flame-retardant fiber is from 0.5 to 10% by mass relative to 100% by mass of the total mass of the polyetherimide (A), the thermoplastic polymer (B), and the functional additive (C).

15. The method as claimed in claim 14, wherein the functional additive (C) is kneaded into a part of the thermoplastic polymer (B) to prepare a master batch, and subjecting the master batch, the polyetherimide (A), and the remaining thermoplastic polymer (B) to melt-kneading and subsequent melt-spinning.

16. The method as claimed in claim 14, wherein the functional additive (C) is kneaded into the polyetherimide (A), the thermoplastic polymer (B), and/or the polymer blend, and the melt-spinning is conducted at a temperature of from 300 to 400° C.

17. The method as claimed in claim 14, wherein the fiber obtained by subjecting the polymer blend to melt-spinning is impregnated with the functional additive (C) at a temperature of from 80 to 140° C.

* * * * *